(12) United States Patent
Siccardo et al.

(10) Patent No.: US 6,591,112 B1
(45) Date of Patent: Jul. 8, 2003

(54) COMMUNICATION SYSTEM AND DEVICE USING DYNAMIC RECEIVER ADDRESSING

(75) Inventors: Paolo L. Siccardo, Los Altos, CA (US); Padmanabha R. Rao, Milpitas, CA (US)

(73) Assignee: PPM, Inc., Los Altos Hills, CA (US)

( * ) Notice: Subject to any disclaimer, the term of this patent is extended or adjusted under 35 U.S.C. 154(b) by 79 days.

(21) Appl. No.: 09/648,179

(22) Filed: Aug. 25, 2000

Related U.S. Application Data

(63) Continuation of application No. 08/920,512, filed on Aug. 29, 1997, now Pat. No. 6,115,605.

(51) Int. Cl.[7] .................................................. H04Q 7/20
(52) U.S. Cl. ........................ 455/521; 455/456; 455/404
(58) Field of Search ................................. 455/456, 426, 455/411, 432, 404, 522, 466, 410, 414; 340/825.31, 825.34, 825.3

(56) References Cited

U.S. PATENT DOCUMENTS

| 4,878,051 | A | | 10/1989 | Andros et al. | 340/825.44 |
|---|---|---|---|---|---|
| 5,254,986 | A | | 10/1993 | DeLuca | 340/825.44 |
| 5,278,890 | A | | 1/1994 | Beeson, Jr. et al. | 379/57 |
| 5,329,573 | A | | 7/1994 | Chang et al. | 379/58 |
| 5,519,403 | A | | 5/1996 | Bickley et al. | 343/112 |
| 5,539,395 | A | * | 7/1996 | Buss et al. | 340/7.43 |
| 5,579,443 | A | * | 11/1996 | Tatematsu et al. | 455/521 |
| 5,598,460 | A | * | 1/1997 | Tendler | 379/37 |
| 5,604,921 | A | | 2/1997 | Alanara | 455/45 |
| 5,633,913 | A | | 5/1997 | Talarmo | 379/59 |
| 5,799,061 | A | * | 8/1998 | Melcher et al. | 379/45 |
| 5,918,172 | A | * | 6/1999 | Saunders et al. | 455/404 |
| 5,956,640 | A | | 9/1999 | Eaton et al. | 455/432 |
| 5,960,337 | A | * | 9/1999 | Brewster et al. | 455/404 |
| 5,978,686 | A | | 11/1999 | Aoshima | 455/525 |
| 6,052,574 | A | * | 4/2000 | Smith, Jr. | 455/404 |
| 6,115,605 | A | | 9/2000 | Siccardo et al. | 455/426 |
| 6,212,393 | B1 | * | 4/2001 | Suarez et al. | 455/456 |
| 6,519,463 | B2 | * | 2/2003 | Tendler | 455/456 |
| 2002/0068549 | A1 | * | 6/2002 | Tendler | 455/414 |
| 2002/0090973 | A1 | * | 7/2002 | Tendler | 455/552 |

* cited by examiner

Primary Examiner—Tracy Legree
(74) Attorney, Agent, or Firm—Townsend and Townsend and Crew LLP

(57) ABSTRACT

Method and a system for establishing a communication channel between a first communication device, or alternatively, a communication network operator, and one or more second communication devices. The identity of the one or more second communication devices is not pre-determined by the first communication device (or the communication network operator). Instead, the identity of which one or more of the second communication devices connects to the first communication device (or the network operator) is determined by the operation of one or more filters transmitted by the first communication device (or the network operator) on certain data that are both transmitted by the first communication device (or the network operator) as well as measured locally at each of the second communication devices.

21 Claims, 8 Drawing Sheets

COMMUNICATION SYSTEM AND DEVICE USING DYNAMIC RECEIVER ADDRESSING

This application is a divisional of U.S. patent application No. 08/920,512, now U.S. Pat. No. 6,115,605, filed Aug. 29, 1997, which is incorporated herein by reference in its entirety for all purposes.

BACKGROUND OF THE INVENTION

The present invention relates generally to telecommunications, and more specifically to wireless messaging systems.

In connection with communication systems, especially radiotelephone and paging systems, it is well known that the identity and/or functionality of particular subscriber receiver units with whom a calling party or the communication network operator wishes to establish a communication channel is either predetermined and fixed, or can be selected a priori either by the calling party, the communication network operator, or the particular subscriber themselves. By a priori it is implied that the selection is done prior to reception of data by the particular subscriber receiver units.

FIG. 1 depicts the high level operation of a typical prior art communication network. In the figure, a first device originates a request for establishing communication with any one or several of second communication devices. The first device connected to the communication network either via the internet or via a regular Plain Old Telephone System (POTS). Of course, other connecting technologies may also be used for connecting the first communication device to the communication network. The message from the first communication device is packaged and transmitted by the communication network operator to several second communication devices through localized Towers or Base Stations or Exchanges (nomenclature well recognized by one skilled in the art). Only a subset of the several second communication devices recognizes its address embedded in the transmitted message and consequently only this subset receives the transmitted message.

FIG. 2 depicts the operation of a prior art second communication device used in conjunction with the existing communication network depicted in FIG. 1. The transmitted signal contains an identification tag, labeled Transmitted ID in the figure, indicating which one or several of the second communication devices are to process the accompanying message data. The box labeled Front End in the figure encapsulates all the circuitry in the device required for interfacing the device with the communication network and extracting the contents of the transmitted signal (i.e., Transmitted ID and Message). The Transmitted ID is checked for equivalence with a locally stored ID and if there is a match (i.e., the two are equal), the accompanying Message data is further processed to result in some appropriate action (e.g., display of message, generation of tone, etc.). If there is no match the Message data is discarded and the receiver simply ignores the incoming transmitted signal.

For ease of understanding, the block diagram of the communication device in FIG. 2 is divided into three different spaces: Data Space, Filter Space, and Action Space. The Data Space in FIG. 2 simply consists of one or several pre-defined numerical values (referred to here as ID values) using which the particular device can be identified. These ID values may be unique or shared with other devices; however, in all cases they are predetermined before transmission of data to the device. The Filter Space is responsible for checking equality between Transmitted ID and local ID and generating a True/False answer. In essence the output of the Filter Space determines whether or not the Transmitted Message was intended for reception by the communication device. The Action Space is the result of processing of the received message in the event Filter Space returns True, else it is null, i.e., there is no action.

SUMMARY OF THE INVENTION

The invention relates to a method and a system for establishing a communication channel between a first communication device, or alternatively, a communication network operator, and one or more second communication devices. The identity of the one or more second communication devices is not pre-determined by the first communication device (or the communication network operator). Instead, in certain embodiments the identity of which one or more of the second communication devices connects to the first communication device (or the network operator) is determined by the operation of one or more filters transmitted by the first communication device (or the network operator) on certain data. The data may be transmitted by the first communication device (or the network operator) as well as measured locally at each of the second communication devices.

By virtue of the fact that the nature of the transmitted filter, the value of transmitted data, and the value of locally measured data is variable, i.e., can change with time, the identity of the same second communication device itself can change with time. Further, since the value of locally measured data is typically not determinable by the first communication device, the first communication device cannot determine the identity of second communication device a priori.

A further aspect of this invention relates to the fact that a communication channel established between the originating communication device that makes a request and one or more selected communication devices, each connected to an entity that can service the request, includes a feedback loop that enables the requesting device to continuously receive status updates of the servicing entities through their respective communication devices. Selection of the called communication devices may or may not be dynamically determined.

A further understanding of the nature and advantages of the present invention may be realized by reference to the remaining portions of the specification and the drawings.

DESCRIPTION OF SPECIFIC EMBODIMENTS

Figure 1:
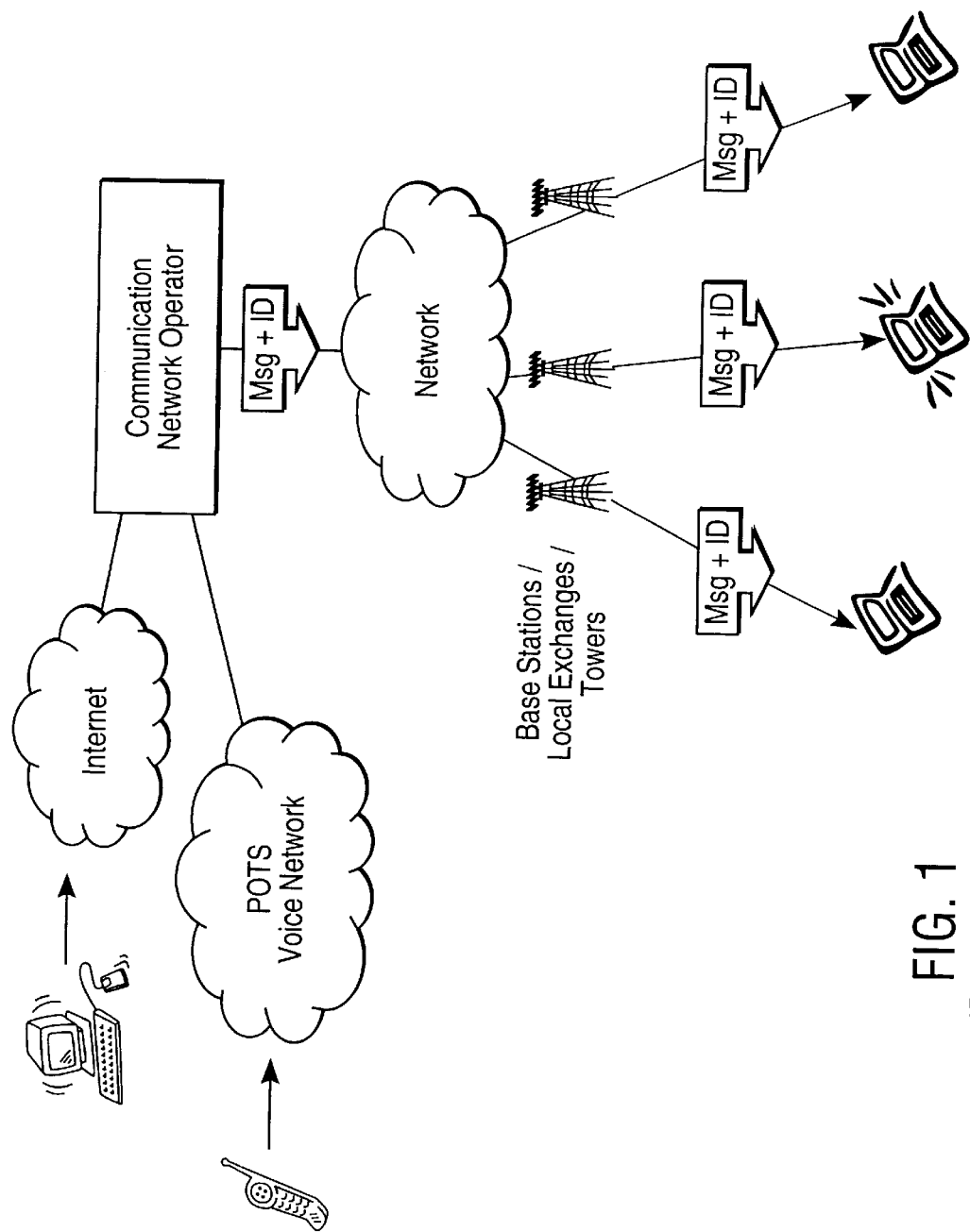
FIG. 1 shows a representative prior art communication system.

The present invention embodies a scheme that significantly enhances the value of currently deployed communication networks by increasing the intelligence of the attached communication devices as well as enriching the message protocol between the various communication devices and the communication network to take advantage of the enhanced intelligence in the communication devices. The present invention provides more flexibility to the users of the communication network and the network operator by allowing the identity of the attached communication devices to vary, possibly in a non-deterministic manner. (In the context of this invention the word "identity" implies a measure that is used to determine whether or not a communication device is the one that is intended for reception of a transmitted message. More than one device may share the same identity.) Furthermore, the nature of variance of the identity of any particular communication device is not required to be known a priori to any device, user, or the network operator. Rather, the actual identity of a particular device is computed using information contained in the transmitted signal and certain other dynamically varying parameters that are only locally available at the device, and furthermore, only at the instant that the identity is computed is it known to that device as to whether or not the transmitted signal was intended for reception by it.

This is in contrast with existing prior art communication networks, especially radiotelephone and paging networks, wherein the identity of any communication device attached to the network is known prior to transmission of any message intended to be processed by said communication device. In certain prior art communication networks, such as television and radio broadcast networks, the sender is not required to know the identity of any receiver unit prior to transmission of data. However, in these networks, the receiving entity needs to know, a priori, which data it is desirous of receiving before it can receive that data. Reception of desired data is then accomplished by "tuning" the receiver to a predetermined mode that is compatible with the transmission format of the desired data.

There are several possible situations, especially when the originator and receiver of information are physically separated, when it is not known a priori as to whether or not a certain receiver requires the information. This is because generally the conditions under which the receiver requires information depend on certain locally varying parameters, such as geographic location, temperature, direction of motion, etc., depending on the application, as well as certain other conditions that are set by the originator of the communication.

For example, in a certain application the originator of the information may want to communicate a particular emergency message to all mobile receiver units that are currently located in a specific geographic region (say within a pre-specified radius of an accident). Which receiver units are eligible to receive the particular emergency signal can only be determined at the instant the communication has to occur, since the movements of all the mobile receiver units are unknown to the sender of the signal. Additionally, even though each receiver unit may know in advance its exact movements, it cannot anticipate at what instant a message is going to originate from the sender, as well as what geographic constraints are embedded in it. Consequently, it cannot choose a priori the type of message it wants to receive. Furthermore, if a particular receiver unit moves outside the specified geographic zone, it is no longer eligible to receive the same message, even though the transmitted signal "may still be visible to it"; in other words, after leaving the specified geographic zone, it assumes a different identity with respect to the said message. Prior art communication receivers and networks do not readily support implementation of such a flexible communication paradigm.

Figure 2:
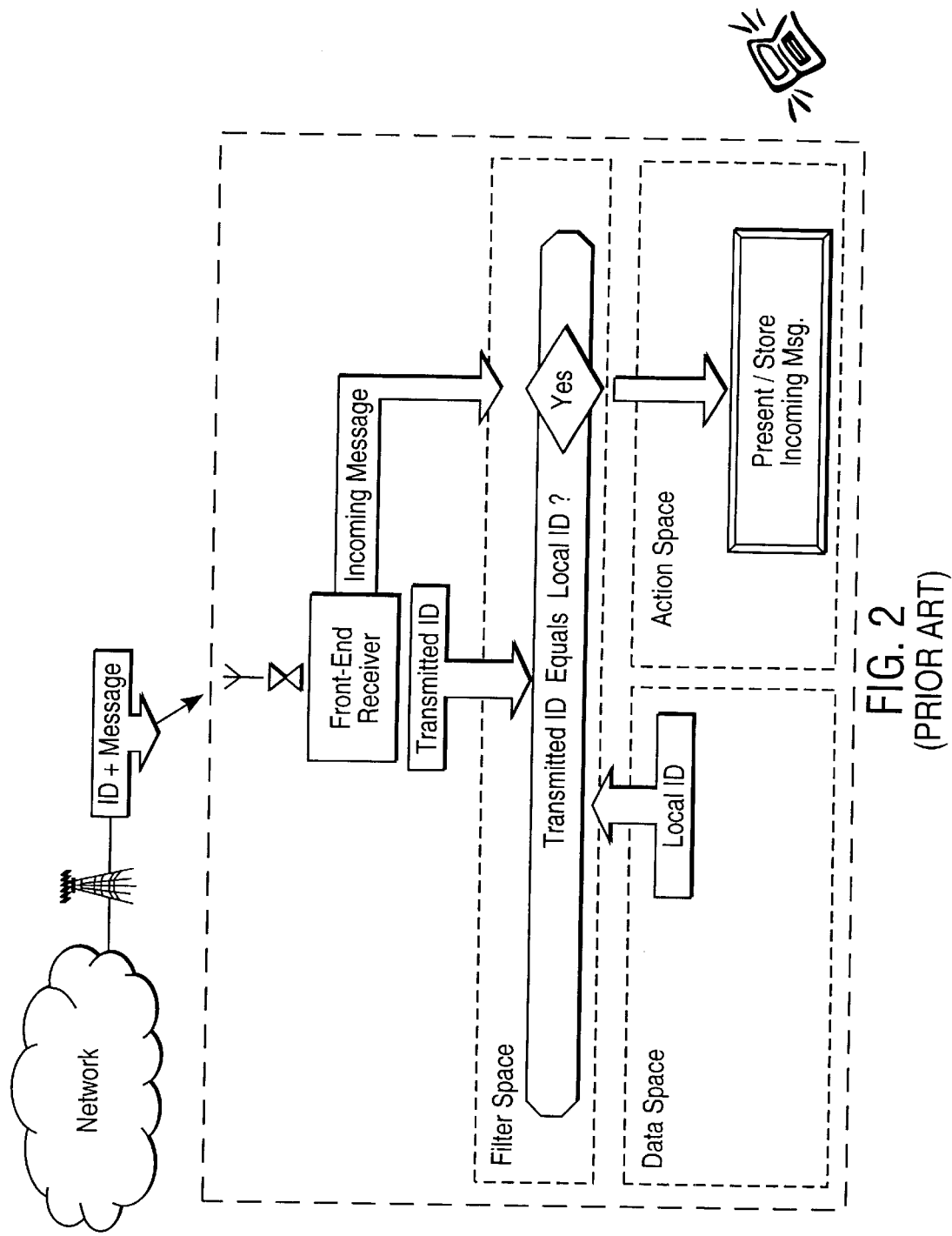
FIG. 2 shows the operation of a communication device in conjunction with the prior art communication system depicted in FIG. 1.
Figure 3:
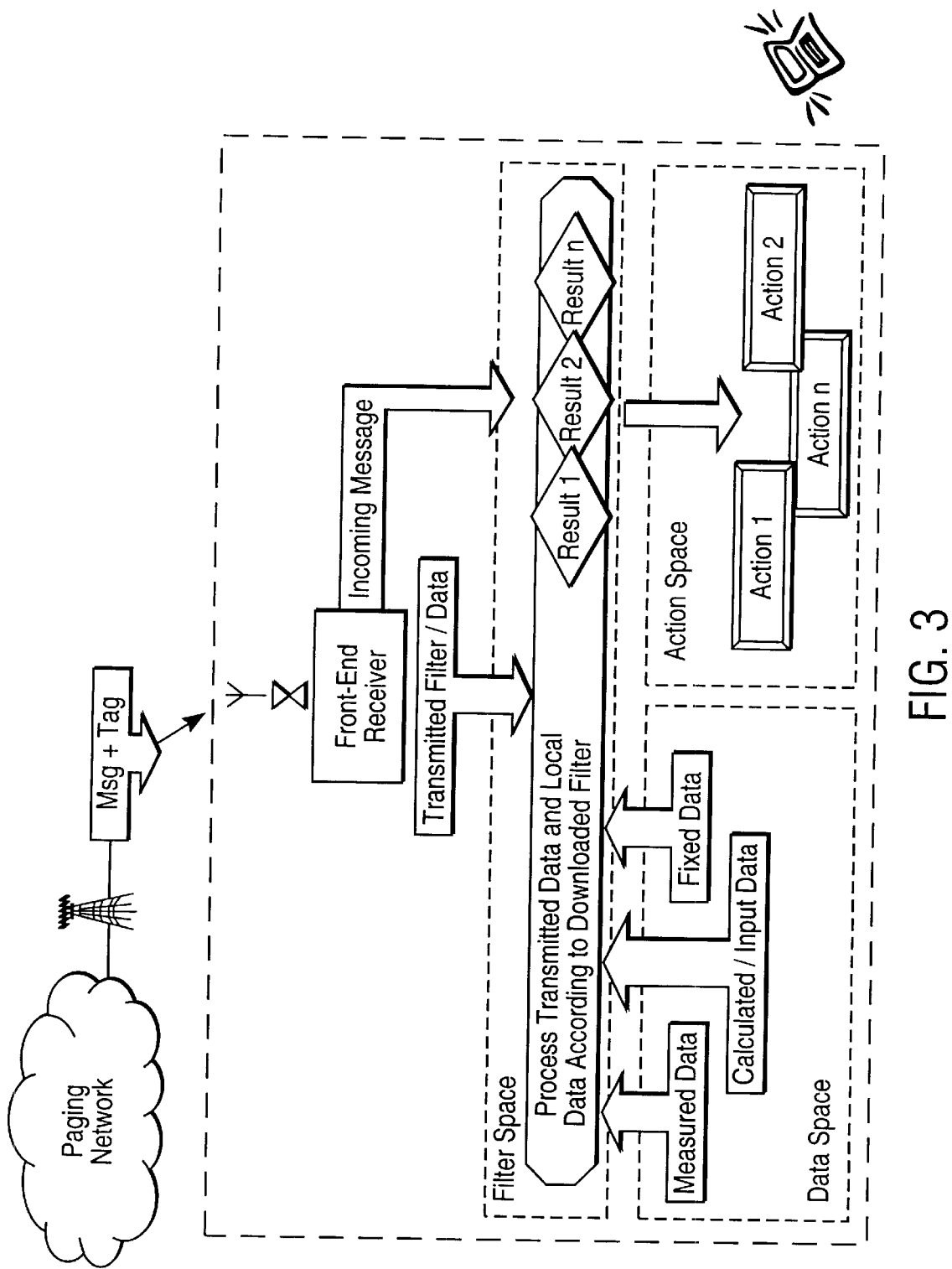
FIG. 3 shows the operation of a communication device that is used in conjunction with a communication system embodying the invention.

FIG. 3 depicts the operation of a communication device when it is used in conjunction with a communication network that supports the scheme embodied in the present invention. The differences between the diagrams in FIG. 3 and FIG. 2 are related to the information contained in the Transmitted signal, the Data Space, and the Filter Space.

The Transmitted ID field of the transmitted signal in the present invention is significantly enhanced as compared to prior art systems to include additional data along with one or more "filters". A filter, in the context of this invention, is simply an algorithm or a rule that when applied to certain data results in a True/False answer.

Prior art communication networks also employ a filter, albeit a degenerate "equality" filter, that simply verifies equality between two numbers. This was illustrated in FIG. 2. Furthermore, the filter definition in prior art implementations is fixed and not alterable once the communication device is deployed. For this reason the definition of the filter is not required to be transmitted in prior art communications since every communication device already knows it. Only the data is transmitted and this has been referred to in FIG. 2 as Transmitted ID.

The actual specification of filters in the transmitted signal of the present invention is a matter of implementation. In certain networks, where it is desired that the implementation be simple, the network operator and all communication devices agree a priori to a certain set of applicable filter definitions. Each one of these filter definitions is assigned a unique code and the mapping between filter definition and code is stored in non-volatile memory in every communication device. The communication network also has a copy of this mapping available to it. Whenever a particular filter definition is required to be transmitted, its corresponding code (along with any required data) is transmitted instead. All receiving communication devices and the network can regenerate the filter definition from their local copy of the mapping. In certain other networks, where it is desired to have significant sophistication, entire definitions of filters are transmitted. The definitions are in the form of object code that can be executed in all communication devices. Alternatively, the definitions may be in the form of a platform-independent language, such as Java. In this case each communication device is equipped with an appropriate interpreter (such as a Java interpreter) using which it can convert the filter definition into an executable set of commands.

Another feature of the invention relates to the Data Space over which the filter operates. In prior art communication devices the Data Space consists of one or several predetermined numerical values, which are used to specify the identity of the communication device. The Filter Space operation consists of verifying equality between any one of these values and the Transmitted ID value. In this invention, the Data Space can be significantly expanded to include not only stored, pre-determined values, but also values that are dynamically generated through measurement of one or more localized parameters. For example, in one embodiment, the localized parameter is the geographic location of the communication device, as measured or indicated by a GPS receiver that is connected locally to the communication device. In another embodiment, the localized parameter is a temperature value that is input to the communication device from a temperature sensor connected to it. In yet another embodiment, the localized value is an indicator of current inventory status of certain merchandise that is being monitored by the user of the communication device. These are but illustrations of quantifiable parameters whose value is being input to the communication device. The important point is that the locally generated value is not necessarily fixed and unvarying; rather, it can vary with time depending on the local conditions surrounding the communication device.

The locally generated parameter values can be entered into the communication device either on a continual basis, or they may be sampled at discrete time instants. This is a matter of implementation and is dependent on the particular application.

Another feature of the invention relates to the Filter Space. As mentioned previously, the Filter Space in prior art implementation consists of the operation of checking equality between the Transmitted ID and one or more of locally stored ID values in the device's Data Space. In the present invention the Filter Space is expanded to imply a generalized filter operation on data carried as part of the Transmitted signal, as well as the dynamically varying data available from the communication device's Data Space. The filters used for the operation may be either stored in the communication device's non-volatile memory, or they may be downloaded from the received signal, as described above. The result(s) obtained from the filter(s) operations is(are) used to determine if the Transmitted Message is intended to be received by the communication device. In other words, the result(s) determine the identity of the communication device with respect to said Transmitted Message.

An important consequence of including dynamically varying local data in the Data Space is that the result of applying the transmitted filter to the data can no longer be predicted in advance by the communication device, its user, or the network. Since the purpose of applying the filter is to determine whether or not a particular communication device is eligible to receive the message, it is quite possible that the same device may or may not be found eligible to receive a particular message based on the available data in its Data Space. In other words, the identity of any communication device is no longer fixed, but is dynamically determined by its local conditions.

Figure 4:
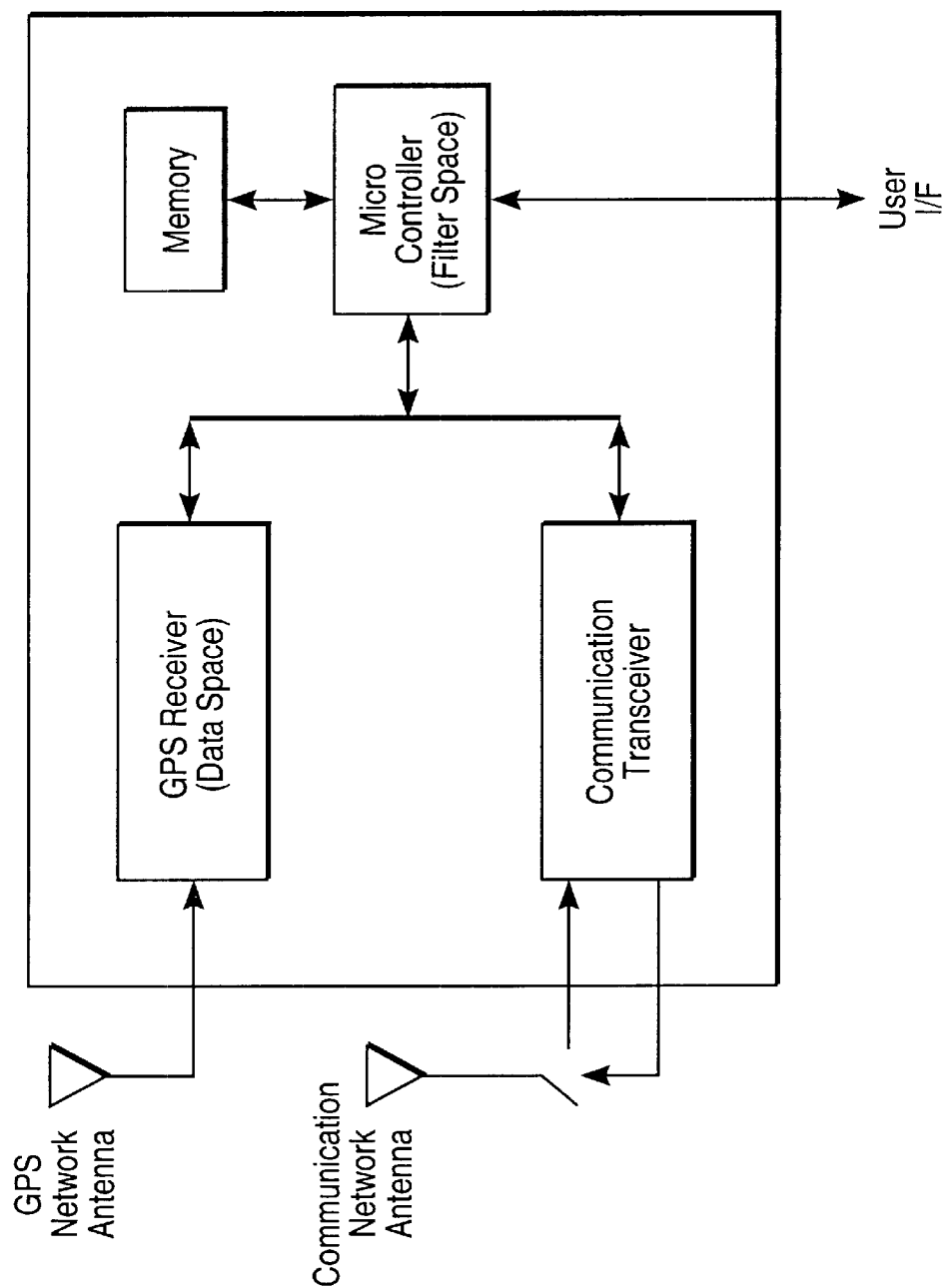
FIG. 4 shows a specific embodiment of the communication device of FIG. 3.

FIG. 4 shows a specific embodiment of the device described with reference to FIG. 3. The unit depicted in FIG. 4 contains a Global Positioning Satellite (GPS) receiver, a communication transceiver suited to the appropriate network the unit is designed for, and a micro-controller. The function of the Data Space portion of the generalized module described in FIG. 3 is fulfilled by the GPS receiver. The purpose of the GPS receiver is to monitor the signals available from the GPS satellites and determine the location of the unit. This scheme is well established and known to those skilled in the art. The current location of the unit, i.e., latitude, longitude and altitude, is the local data on which the downloaded filter operates. The function of the communication transceiver sub-system in FIG. 4 is to provide connectivity to the external network.

The Filter Space of the unit in FIG. 4 is implemented as software inside the host micro-controller. For example, in a specific application, the definition of the downloaded filter may be: "return true if current location is within a pre-specified distance of a pre-specified location." In other words, executing the filter involves determining if the distance between the pre-specified (i.e., downloaded) location and the unit's current location is smaller than the pre-specified (i.e., downloaded) distance value. This can be done inside the micro-controller; the result is also interpreted by the software in the micro-controller using which it determines the actions to be taken. The Action Space in FIG. 4 is represented by the user interface arrow ("user I/F"), which is controlled by the host micro-controller.

It can be appreciated by those skilled in the art that implementing the Filter Space as software renders it relatively simple to change the filter definition. For example, the definition of the filter in the previous paragraph can be easily altered to imply a different distance calculation. The same unit that responds to the first filter with a true condition may respond to the second filter with a false condition. In other words, the identity of the unit changes with the definition of the filter, as has already been explained above.

Figure 5:
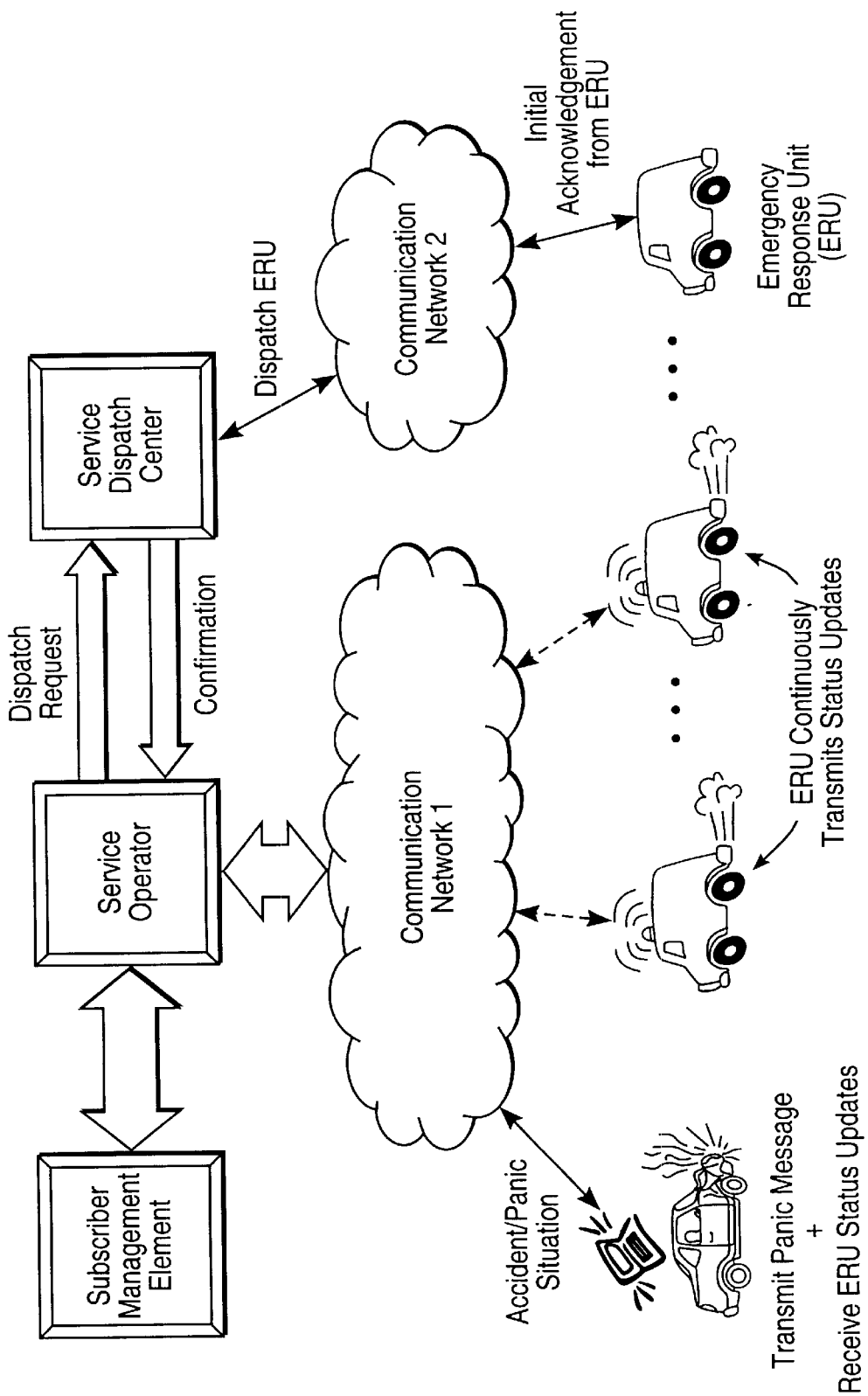
FIG. 5 shows a communication system having a feedback loop according to an embodiment of the invention.

FIG. 5 illustrates a further aspect of this invention. This aspect relates to applications involving situations in which an entity requests a service from a remote location. The request is made through existing bi-directional communication networks that allow the service operator to communicate back with the requester. However, the service being requested itself is of such nature that it requires physical movement of one or more entities from a remote location to the requester, an activity that cannot be performed using the communication network over which the request is made. (In contrast, an example of an application wherein the requestor is serviced over the same network as the one on which the request is made is downloading of data over a computer network. In this case the request is made from one computer to another over, say, an ISDN network. The response is transmission of computer data over the same ISDN network back to the first computer.)

FIG. 5 depicts a situation wherein a person involved in an automobile accident requires prompt medical attention. The person makes the request to the service operator using an existing communication network, e.g., PSTN, cellular, etc. In one embodiment of the invention, all communication between the terminal unit and the service operator is carried out via exchange of only data signals, i.e., without the exchange of voice or video signals. One advantage of communication using data-only signals is the low bandwidth requirement of non-audio/non-video signals.

The terminal unit attached to the calling person is similar to the one whose block diagram appears in FIG. 4. Essentially, this terminal unit contains within it a "location-calculator", such as a GPS receiver, a communication transceiver and a micro-computer. When the user triggers a panic call a specially coded message is transmitted from the terminal device to the service operator containing information such as the identity code of the user and the terminal device, the nature of the emergency, the current location of the terminal device, and the time at which the call was triggered.

On receiving the request the service operator performs several actions, including, validation and authentication of the person requesting the service, determining the nature of the emergency, determining if the calling person has any special needs such as those relating to specific health conditions, determining the location of the calling person, and determining the most appropriate emergency response unit (ERU) to summon. As depicted in FIG. 5 the service operator is connected to an entity called the Subscriber Management Element (SME), whose role is to store and provide all the relevant information relating to the subscriber, such as identification, password, address, credit history, billing status, etc.

Once the service operator determines the most appropriate ERU to call (based on, among other factors, the location of the calling person and any special needs they may have), it transmits a message to the Service Dispatch Center (SDC) indicating all the relevant information pertaining to the subscriber and the particular emergency situation. The responsibility of the SDC is to call the ERU as directed by the service operator.

In one embodiment of this system the service operator is completely automated, i.e., implemented without the involvement of any human being in the processing of data. It is possible to implement the dispatching of the ERU by the SDC using the dynamic addressing scheme described in the first aspect of this invention although it is not necessary for the purposes of the second aspect of this invention that the first aspect be used.

Establishing the initial contact with the ERU triggers the generation of a first confirmation or acknowledgement signal from the SDC to the service operator. This first confirmation is immediately relayed to the calling person by the service operator. The purpose of the initial acknowledgement is to immediately notify the person in distress that his/her request has been received by the appropriate response unit. In one embodiment of the invention, the Expected Time of Arrival (ETA) of the ERU at the site of the accident is also presented to the person.

In the system architecture of FIG. 5, all messages between the terminal unit, the service operator, and the SDC are time-stamped. This means the time of the original call, the actual time at which the ERU is first notified, as well as the time of the first acknowledgement, are all captured and logged in the system.

In most situations it is not possible for the ERU to instantaneously arrive at the location of the caller, even though the ERU may respond immediately to the initial call. However, it could be beneficial for the original caller to be made aware of the progress being made by the ERU toward providing the requested service, e.g., how near the ERU is to the caller, or how soon it is going to reach the caller. Depending on the situation this information may be used by the caller to mitigate his/her current exigency.

This invention extends the concept of the initial acknowledgement to include transmission of current status of the ERU to the original caller on a continual basis via the bi-directional communication network. An aspect of this invention is that such status updates are provided automatically without the intervention of any human being. For this to happen the ERU has to be equipped with a device similar to that depicted in FIG. 4, i.e., a device that can compute its current geographical coordinates and communicate that to a remote device.

Again, referring to FIG. 5, once the SDC has established the initial call with the ERU, it obtains all necessary parameters of the particular ERU that are required to maintain communications with that ERU, in particular the address of the terminal device attached to the ERU. This information is sent back to the service operator, upon the receipt of which the service operator establishes a direct connection with the ERU. Once a connection is established the ERU can transfer information regarding its current status to the service operator for further relay to the calling person. For example, the ETA of the ERU based on its current location can be computed and relayed back to the calling person. Information may be uploaded from the ERU to the service operator either automatically by the ERU (i.e., whenever it wants to), or it my be uploaded on-demand from the service operator (i.e., whenever it is asked to upload by the service operator). To those skilled in the art it is easy to appreciate that either mechanism can be easily deployed, and it is a matter of implementation choice as to which one is actually employed in a particular embodiment.

Figure 6:
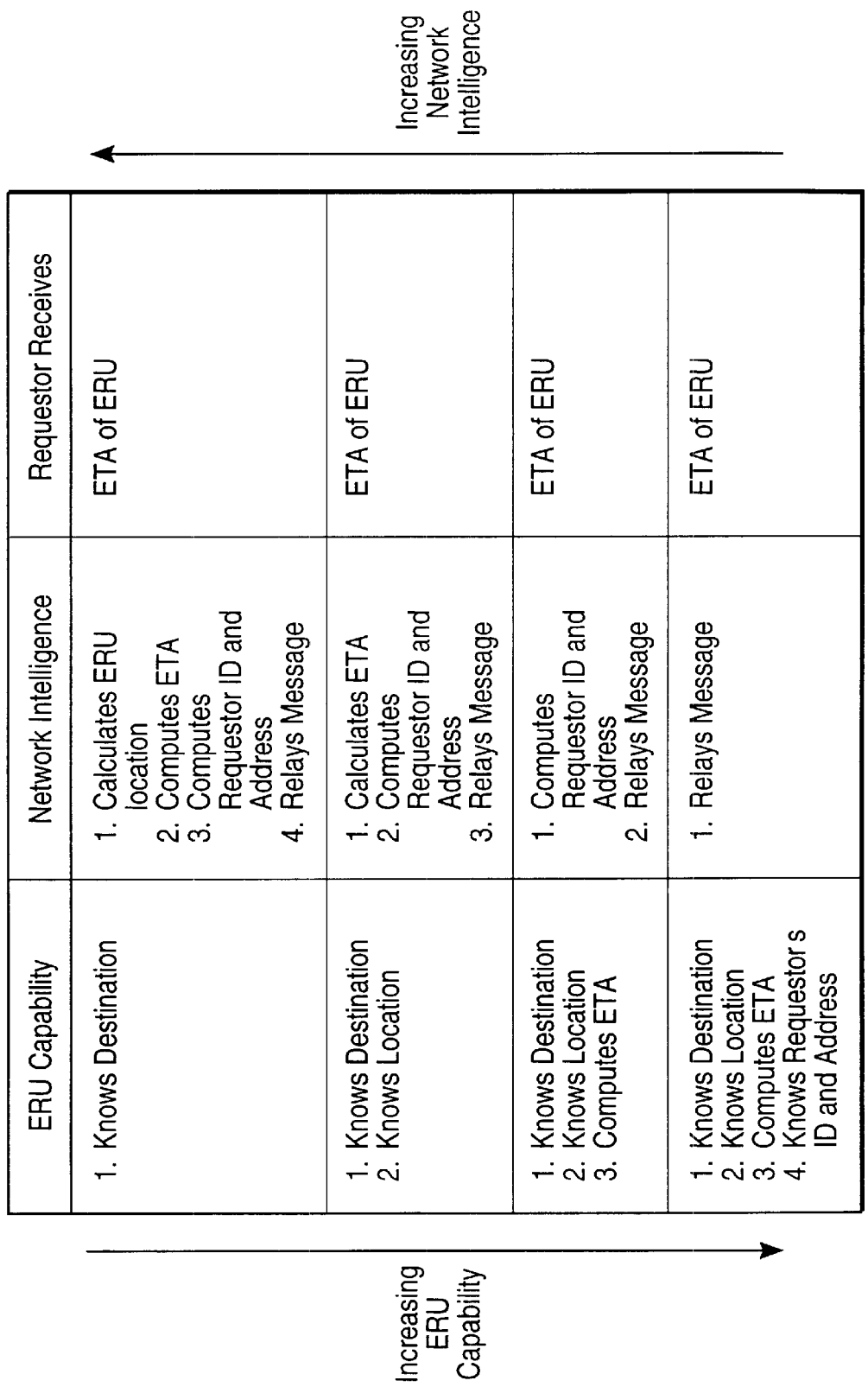
FIG. 6 is a table illustrating design considerations relating to providing capabilities in the mobile device and the network.

There are several possible configurations that enable the system to capture and relay back to the calling person the status of the ERU. The different configurations trade-off the amount of intelligence residing in the terminal unit carried by the ERU and the service operator. FIG. 6 depicts a table showing the trade-off between the ERU and the service operator. In FIG. 6 the direction of increasing ERU terminal device intelligence corresponds to decreasing service operator intelligence, and vice versa. For example in the first row of the matrix, it is shown that the terminal device in the ERU merely knows what its destination is (this would have been conveyed to it by the SDC). In contrast, the service operator determines the location of the ERU using raw GPS data transmitted to it by the ERU terminal device, computes the ETA at the emergency location, computes the requester's address value (i.e., matches the incoming ERU message to the destination's address), and finally transmits the information to the requester. At the other extreme, as shown in the bottom row of the matrix in FIG. 6, all the above steps are performed in the ERU itself, and the service operator merely relays any information from the ERU to the requester. The other cases in FIG. 6 all fall between these two extremes. Which one of the different configurations is deployed in a particular embodiment is a matter of implementation choice.

There are several methods for computing the ETA given the current location of an entity and its intended destination location. One simple mechanism is to first compute the distance between the current point and the destination point and divide the result by the average speed of travel. The quotient obtained through the division added to the current time at the destination results in the ETA at the destination. Depending on available information it may be possible to improve upon the ETA number by taking into account any real-life conditions, such as anticipated traffic delay during rush hour. Distance computation between two points on the surface of the earth, given their latitude, longitude and altitude is a well-researched topic, and many formulas for the same exist in prior art.

Figure 7:
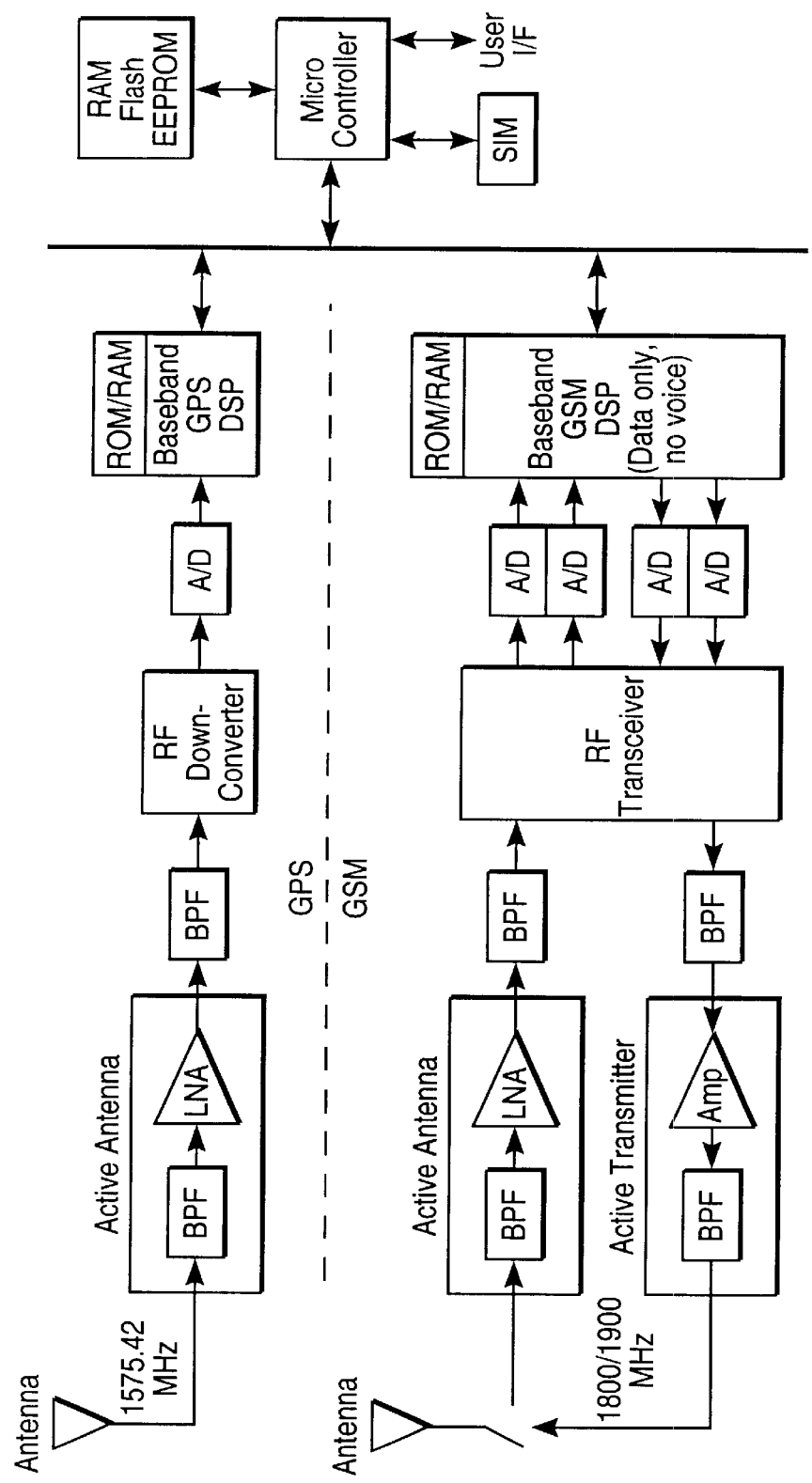
FIG. 7 is a detailed block diagram of an embodiment of the communication device.

FIG. 7 shows additional details of the terminal device depicted in FIG. 4. In FIG. 7 the GPS subsystem captures and records the geographic location of the terminal unit. GPS stands for Global Positioning System, and is a system made freely available to the public by the US Government. A short description of the GPS system is given below; however, its operation is well known to those skilled in the art and can be found easily in existing literature.

The GPS system consists of 24 satellite orbiting the earth at an approximate height of 11,000 miles. Each satellite completes a revolution around the earth in about 12 hours. Signals transmitted by multiple satellites are captured by the GPS subsystem and used to determine its geographic co-ordinates.

The front-end of the GPS subsystem consists of an active antenna that bandpass filters the satellite signals at a frequency of 1575.42 MHz, amplifies it using a Low Noise Amplifier (LNA) and feeds it to an RF downconverter, which down-converts the incoming frequency and further filters the signal before transferring it to an analog-to-digital convertor. The typical frequency of the signal at the output of the RF processor is 430 KHz. This signal processing is well known to those skilled in the art. The digitized signal leaving the analog-to-digital converter is subsequently decoded by a baseband processor. The baseband processor is typically a DSP chip with embedded firmware that is optimized to handle the GPS signals, although other, more hardware based, implementations are also possible. Using information from 4 satellites simultaneously, the GPS subsystem can accurately track the longitude, latitude, altitude and velocity of the mobile unit.

The function of the communication subsystem in FIG. 7 is to provide connectivity to the terminal unit with the communication network. In general, with reference to the system described in connection with FIG. 5, the actual nature of the communication network is not important to this invention, so long as this network supports basic, low bandwidth, bi-directional message passing.

In FIG. 7, the GSM digital cellular network is used as an example for the communication network. GSM is a recently ratified global wireless standard, available in most of the world's nations. It supports a rich and flexible messaging protocol called Short Message Service, or SMS, which can be used for the transferring the messages between the requesting entity, service operator, service dispatch center, and response unit of FIG. 5. Although GSM is used as an example of a particular embodiment other wireless communication standards such as CDMA and TDMA can also be used in the context of FIG. 5. The portions of the terminal unit affected by the network technology relate to the communication subsystem; the overall functionality remains the same.

The GSM signal is transmitted around one of three frequencies depending on the location of the network: 900 MHz, 1800 MHz, and 1900 MHz. However, the basic protocol structure and encoding technology is the same in all cases. As in the GPS data path, the incoming analog RF frequency is filtered, downconverted, digitized and decoded by the DSP. The firmware in the DSP extracts information retrieved from the incoming signal and passes it to the microprocessor. The process for outgoing messages is reversed.

The unit includes an RF transceiver, which performs the functions of decoding and encoding of data. There is no support for voice data in the terminal unit of FIG. 7. The host computer subsystem in FIG. 7 comprises a simple microcontroller along with small amounts of volatile and non-volatile memory. The microcontroller controls the GPS and communication subsystems as well as interacts with the user. Memory is required for storing both the resident application software as well as other data relating to the use of the terminal unit. The unit further includes a Subscriber Interface Module (SIM), whose function is similar to the SIM modules used in GSM cellular phones, as is known to those skilled in the art. The user I/F represents the keypad, display and other interfaces required to communicate with the user.

Figure 8:
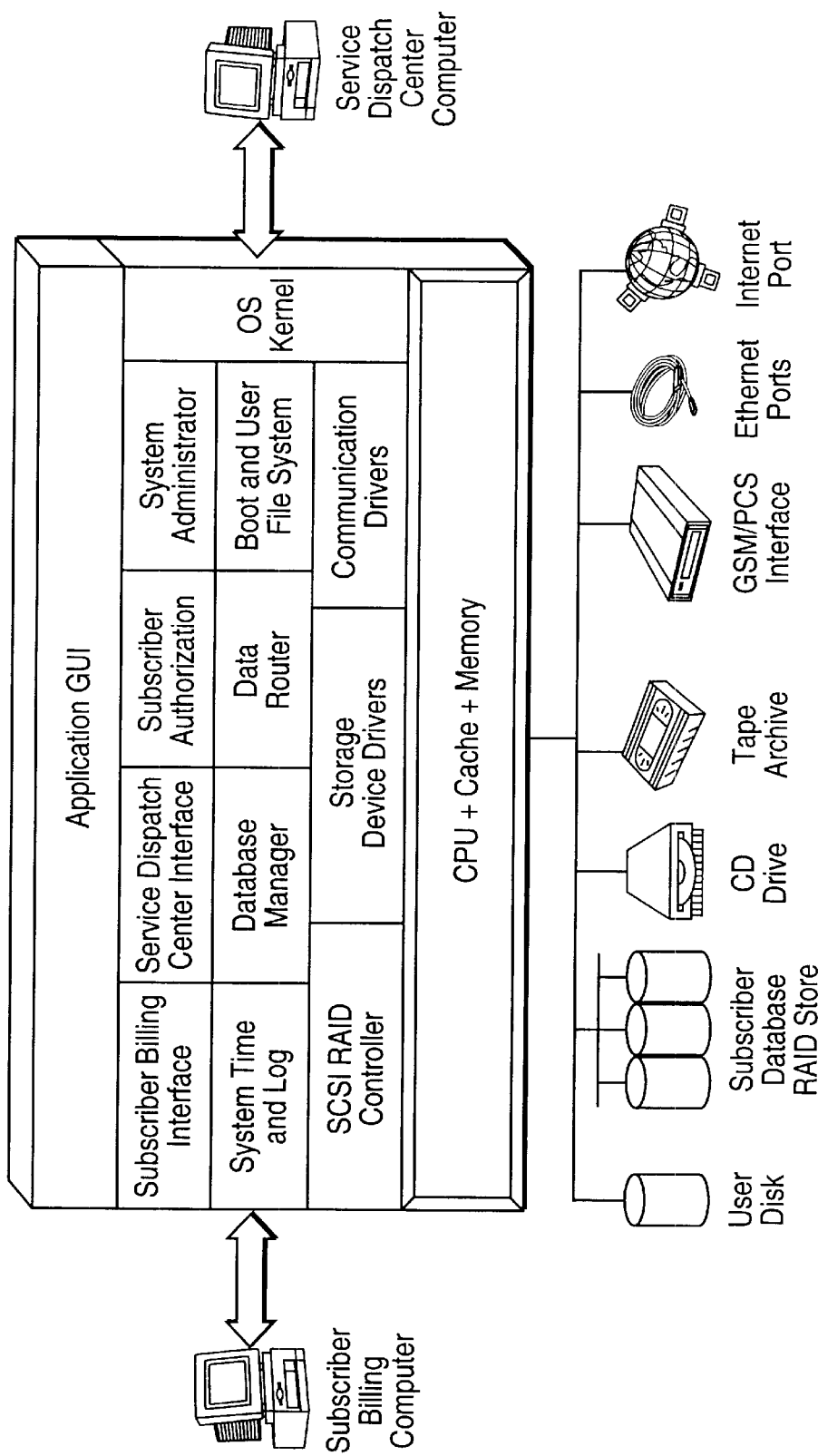
FIG. 8 is a detailed block diagram of an embodiment of the service operator.

FIG. 8 depicts the architecture of the service operator entity of FIG. 5. As described above, the service operator is the "brains" of the system. It is the hub of the entire system, connecting to the terminal unit attached to the requester, the subscriber management element, the service dispatch center, and the response unit. It performs authentication and validation of the requesting entity based on information obtained from the subscriber management element, message routing, determination of location and type of service requested, directing the service dispatch center operator to the appropriate response unit, and returning service status information to the requesting entity. The service operator is preferably implemented to execute as a fully redundant system with no single points of failures.

FIG. 8 depicts an embodiment of the service operator that presents an extremely modular design wherein the externally visible applications are separated from the supporting hardware and software. A distributed-modular architecture allows for system scaling with subscriber growth. The specific embodiment of FIG. 8 depicts the service operator as having several communication ports. The need for any of these ports is dependent on the implementation, and is typically the choice of the system designer.

The lowest layer of the software consists of all the drivers and RAID controller. The function of the RAID controller is to control the RAID database array that stores all the information relating to all subscribers. The choice of RAID is for illustration purposes only; certainly other storage schemes could be employed. Just above the driver layer in FIG. 8 sits the "middleware" portion of the service operator. The modules shown in the figure are merely for purposes of illustration; other modules could be required in certain other embodiments of the service operator. The highest software layer is the Application Graphical User Interface (GUI) that allows rapid and flexible development of applications.

The service dispatch center in FIG. 8 consists of fault-tolerant computers redundantly connected to the service operator. These computers are staffed by qualified operators who promptly respond to incoming messages from the service operator by calling the appropriate response units. An initial acknowledgement is returned to the network server as soon as the appropriate response unit has been notified, as described above.

To maintain accurate logs of all transactions, every message is allocated a unique identity code, messages belonging to the same session are tagged to indicate the link between them, and every message is time and date-stamped at the transmitting and receiving stations. The function of the Subscriber Billing Computer in FIG. 8 is to maintain all the financial records relating to the person requesting the service. This includes information such as level of service subscribed to, and credit and payment history. The service operator interacts with the Subscriber Billing Computer to determine the level and quality of service to be provided to the requesting entity.

As described above the terminal device attached to the response unit can come in several flavors, as depicted in FIG. 6. In one embodiment, the terminal unit uses the architecture depicted in FIG. 7; such a unit can compute its location, and possibly even its ETA at the target destination. This information is uploaded to the service operator whenever the latter demands the data, as described above. Of course other embodiments are possible as depicted in FIG. 6. However, in all embodiments the basic communication subsystem supports the transfer of information between the response unit and the service operator.

References

The following references are incorporated by reference in their entirety for all purposes:

1. U. S. Pat. No. 5,633,913 to Talarmo, "Method for establishing connection between communication devices." May 27, 1997.

2. U. S. Pat. No. 5,604,921 to Alanara, "Radiotelephone user interface for broadcast short message service." Feb. 18, 1997.

3. U. S. Pat. No. 4,878,051 to Andros et al., "Paging system with commands for changing functionality of a paging receiver." Oct. 31, 1989.

4. U. S. Pat. No. 5,254,986 to DeLuca, "Nation-wide paging with local modes of operation." Oct. 19, 1993.

5. U. S. Pat. No. 5,519,403 to Bickley et al., "Global positioning system communications multi-interface." May 21, 1996.

Conclusion

While the above is a complete description of specific embodiments of the invention, various modifications, alternative constructions, and equivalents may be used. Therefore, the above description should not be taken as limiting the scope of the invention as defined by the claims.

What is claimed is:

1. A system for dispatching a response unit in response to a request from a requesting entity, said system comprising:

a terminal device attached to said requesting entity comprising at least a location tracking device, a wireless communication device, and a computer, said terminal device having the ability to uniquely identify itself and its location over a wireless communication network to a remotely located service operator;

a service operator connected to said wireless communication network having attached to it relevant information relating to said requesting entity, said service operator receiving said request from said requesting entity;

said service operator interpreting said received request, authenticating said requesting entity and calling a service dispatch center with directions to call a response unit, said response unit having attached to it a terminal unit having the ability to uniquely identify itself and its location to a remotely located service operator;

said service dispatch center transmitting to said service operator a first acknowledgement message following first contact with said response unit, said first acknowledgement message including a unique identifier code of said response unit;

said service operator transmitting back to said requesting entity said first acknowledgement message;

said service operator further initiating contact with said response unit and determining its location; and said system using said determined location to compute an Expected Time of Arrival at the location of said requesting entity and transmitting said Expected Time of Arrival to said requesting entity.

2. The system of claim 1 wherein:

the service dispatch center transmits a signal containing a message to the response unit and a specification of a proximity constraint with respect to a specific location;

the response unit applies the proximity constraint to location information of the response unit; and the response unit responds to the remotely located service operator only if the application of the proximity constraint by the response unit results in a true condition.

3. The system of claim 1 wherein the wireless communication network is a radiotelephone network.

4. The system of claim 1 wherein the wireless communication network is a paging network.

5. The system of claim 1 wherein the wireless communication network is a bidirectional wireless communication network.

6. The system of claim 1 wherein:

the response unit downloads a signal from the service dispatch center;

the signal contains a proximity constraint with respect to a specific location as well as a message; and the response unit applies the proximity constraint to location information of the response unit and uses the result of applying the proximity constraint to determine if the response unit is entitled to receive the message contained in the signal.

7. The system of claim 1 wherein:

the service dispatch unit sends to the response unit a signal containing a message to be communicated and at least one specific location;

the response unit has available location information for the response unit; and the response unit responds to the remotely located service operator only if a predetermined proximity constraint is satisfied between the specific location and the location information for the response unit.

8. The system of claim 7 wherein the location information for the response unit is supplied to the-response unit by a global positioning system.

9. The system of claim 7 wherein the location information for the response unit is latitude and longitude coordinates.

10. The system of claim 7 wherein the signal contains data signals and does not include voice signals.

11. The system of claim 7 wherein the signal contains data signals and voice signals.

12. The system of claim 7 wherein the message contains medical information of the requesting entity.

13. The system of claim 1 wherein the terminal unit attached to the response unit includes a location tracking device.

14. The system of claim 13 wherein the location tracking device of the terminal unit attached to the response unit is a global positioning system receiver.

15. The system of claim 1 wherein the location tracking device of the terminal device attached to the requesting entity is a global positioning system receiver.

16. The system of claim 1 wherein the service operator is an automated system.

17. The system of claim 1 wherein the service operator is operated without human involvement.

18. The system of claim 1 wherein said response unit is configured to identify itself and its location over the wireless communication network to said remotely located service operator.

19. The system of claim 1 wherein said response unit is configured to identify itself and its location over a second wireless communication network to said remotely located service operator.

20. The system of claim 1 wherein said response unit is configured to identify itself and its location over the wireless communication network to said remotely located service operator.

21. The system of claim 1 wherein said response unit is configured to identify itself and its location over a second communication network to the service dispatch center.

* * * * *